(12) United States Patent
Kanamarlapudi et al.

(10) Patent No.: US 11,595,861 B2
(45) Date of Patent: Feb. 28, 2023

(54) STATUS DATA UNIT ENHANCEMENT FOR RETRANSMISSION OF PACKETS IN HANDOVER PROCEDURE

(71) Applicant: QUALCOMM Incorporated, San Diego, CA (US)

(72) Inventors: Sitaramanjaneyulu Kanamarlapudi, San Diego, CA (US); Prasad Reddy Kadiri, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/187,274

(22) Filed: Feb. 26, 2021

(65) Prior Publication Data

US 2021/0306914 A1    Sep. 30, 2021

Related U.S. Application Data

(60) Provisional application No. 63/001,104, filed on Mar. 27, 2020.

(51) Int. Cl.
*H04W 36/00* (2009.01)
*H04W 36/08* (2009.01)

(52) U.S. Cl.
CPC ... *H04W 36/0033* (2013.01); *H04W 36/0066* (2013.01); *H04W 36/0072* (2013.01); *H04W 36/08* (2013.01)

(58) Field of Classification Search
CPC . H04W 36/02; H04W 36/08; H04W 36/0033; H04W 36/0069; H04W 36/0055;
(Continued)

(56) References Cited

U.S. PATENT DOCUMENTS

| 2004/0196780 A1* | 10/2004 | Chin | H04L 27/2608 |
| | | | 370/335 |
| 2011/0149905 A1* | 6/2011 | Kim | H04W 36/02 |
| | | | 370/331 |

(Continued)

OTHER PUBLICATIONS

Huawei, et al., "Discussion on ROHC Failure Issue," 3GPP Draft, 3GPP TSG-RAN WG2 #109-e, R2-2000729, 3rd Generation Partnership Project (3GPP), Mobile Competence Centre; 650, Route Des Lucioles; F-06921, Sophia-Antipolis Cedex; France, vol. RAN WG2, No. Electronic meeting; Feb. 24, 2020-Mar. 6, 2020, Feb. 14, 2020 (Feb. 14, 2020), XP051849302, 3 pages, Retrieved from the Internet: URL: https://ftp.3gpp.org/tsg_ran/WG2_RL2/TSGR2_109_e/Docs/R2-2000729.zip R2-2000729 Discussion on ROHC failure issue.doc [retrieved on Feb. 14, 2020] chapter 2.

(Continued)

*Primary Examiner* — Allahyar Kasraian
(74) *Attorney, Agent, or Firm* — Shumaker & Sieffert, P.A.

(57) ABSTRACT

Certain aspects of the present disclosure are directed to a method for wireless communication. The method generally includes receiving at least one first packet of a sequence of packets from a source cell, the at least one first packet being dependent on at least one second packet of the sequence of packets for decoding, performing a handover from the source cell to a target cell, determining that the at least one second packet of the sequence of packets was not received from the source cell, generating a message requesting a retransmission from the target cell for the at least one first packet and the at least one second packet based on the determination, and transmitting the message to the target cell.

20 Claims, 11 Drawing Sheets

(58) Field of Classification Search
CPC ............. H04W 36/04; H04W 36/0072; H04W 36/0066
See application file for complete search history.

(56) References Cited

U.S. PATENT DOCUMENTS

| | | | |
|---|---|---|---|
| 2016/0142951 A1* | 5/2016 | Balasubramanian | ........................ H04W 36/0033 370/331 |
| 2021/0194645 A1* | 6/2021 | Li | ........................ H04L 1/1845 |
| 2021/0297908 A1* | 9/2021 | You | ........................ H04W 36/18 |

OTHER PUBLICATIONS

International Search Report and Written Opinion—PCT/US2021/020251—ISA/EPO—Jun. 16, 2021.
Qualcomm Incorporated: "Remaining Open Issues for DAPS HO," 3GPP Draft, 3GPP TSG-RAN WG2 Meeting #109 Electronic, R2-2001152, 3rd Generation Partnership Project (3GPP), Mobile Competence Centre; 650, Route Des Lucioles; F-06921, Sophia-Antipolis Cedex; France, vol. RAN WG2, No. Feb. 24, 2020-Mar. 6, 2020, Feb. 14, 2020 (Feb. 14, 2020), XP051849520, 3 pages, Retrieved from the Internet: URL: https://ftp.3gpp.org/tsg_ran/WG2_RL2/TSGR2_109_e/Docs/R2-2001152.zip R2-2001152.docx [retrieved on Feb. 14, 2020] chapter 2.1, chapter 2.2.

* cited by examiner

STATUS DATA UNIT ENHANCEMENT FOR RETRANSMISSION OF PACKETS IN HANDOVER PROCEDURE

CROSS REFERENCE TO RELATED APPLICATION

This Application hereby claims priority under 35 U.S.C. § 119 to U.S. Provisional Patent Application No. 63/001,104, filed on Mar. 27, 2020, the contents of which are incorporated herein in their entirety.

FIELD OF THE DISCLOSURE

Aspects of the present disclosure relate to wireless communications, and more particularly, to techniques for handover management.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure are directed to a method for wireless communications. The method generally includes receiving at least one first packet of a sequence of packets from a source cell, the at least one first packet being dependent on at least one second packet of the sequence of packets for decoding, performing a handover from the source cell to a target cell, determining that the at least one second packet of the sequence of packets was not received from the source cell, generating a message requesting a retransmission from the target cell for the at least one first packet and the at least one second packet based on the determination, and transmitting the message to the target cell.

Certain aspects of the present disclosure are directed to a wireless node. The wireless node generally includes a receiver configured to receive at least one first packet of a sequence of packets from a source cell, the at least one first packet being dependent on at least one second packet of the sequence of packets for decoding, a processing system configured to perform a handover from the source cell to a target cell, determine that the at least one second packet of the sequence of packets was not received from the source cell, and generate a message requesting a retransmission from the target cell for the at least one first packet and the at least one second packet based on the determination, and a transmitter configured to transmit the message to the target cell.

Certain aspects of the subject matter described in this disclosure can be implemented in a wireless node. The wireless node generally includes means for receiving at least one first packet of a sequence of packets from a source cell, the at least one first packet being dependent on at least one second packet of the sequence of packets for decoding, means for performing a handover from the source cell to a target cell, means for determining that the at least one second packet of the sequence of packets was not received from the source cell, means for generating a message requesting a retransmission from the target cell for the at least one first packet and the at least one second packet based on the determination and means for transmitting the message to the target cell.

Certain aspects of the subject matter described in this disclosure can be implemented in an apparatus for wireless communications. The apparatus generally includes a first interface configured to obtain at least one first packet of a sequence of packets from a source cell, the at least one first packet being dependent on at least one second packet of the sequence of packets for decoding, a processing system configured to perform a handover from the source cell to a target cell, determine that the at least one second packet of the sequence of packets was not received from the source cell and generate a message requesting a retransmission from the target cell for the at least one first packet and the at least one second packet based on the determination, and a second interface configured to output the message for transmission to the target cell.

Certain aspects of the subject matter described in this disclosure can be implemented in a computer-readable medium for wireless communications. The computer-readable medium generally includes instructions executable to obtain at least one first packet of a sequence of packets from a source cell, the at least one first packet being dependent on at least one second packet of the sequence of packets for decode, perform a handover from the source cell to a target cell, determine that the at least one second packet of the sequence of packets was not received from the source cell, generate a message requesting a retransmission from the target cell for the at least one first packet and the at least one second packet based on the determination and output the message for transmission to the target cell.

Aspects of the present disclosure provide wireless nodes, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
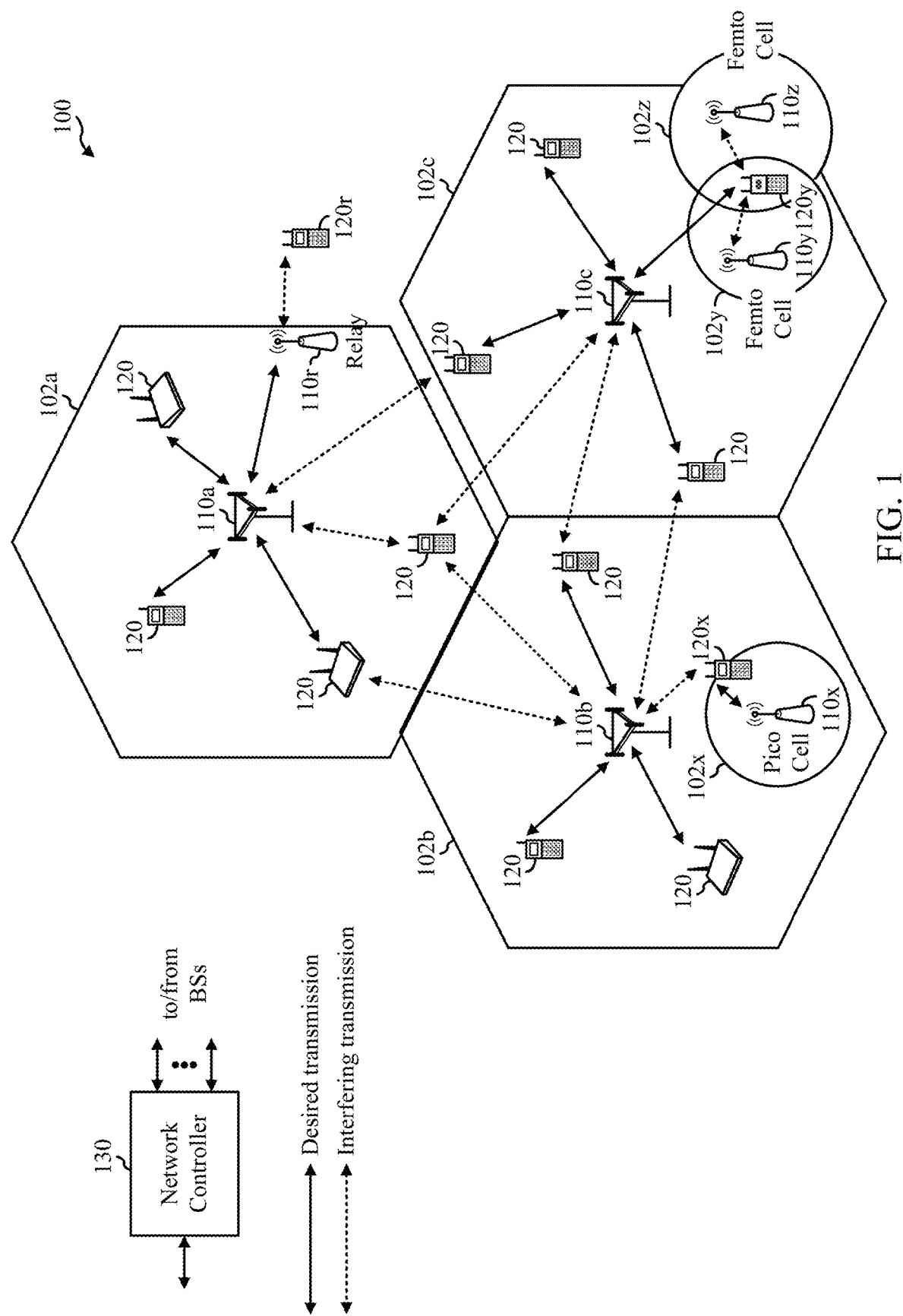
FIG. 1 is a block diagram conceptually illustrating an example telecommunications system, in accordance with certain aspects of the present disclosure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G, 4G or both 3G and 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as the UE or the base station may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
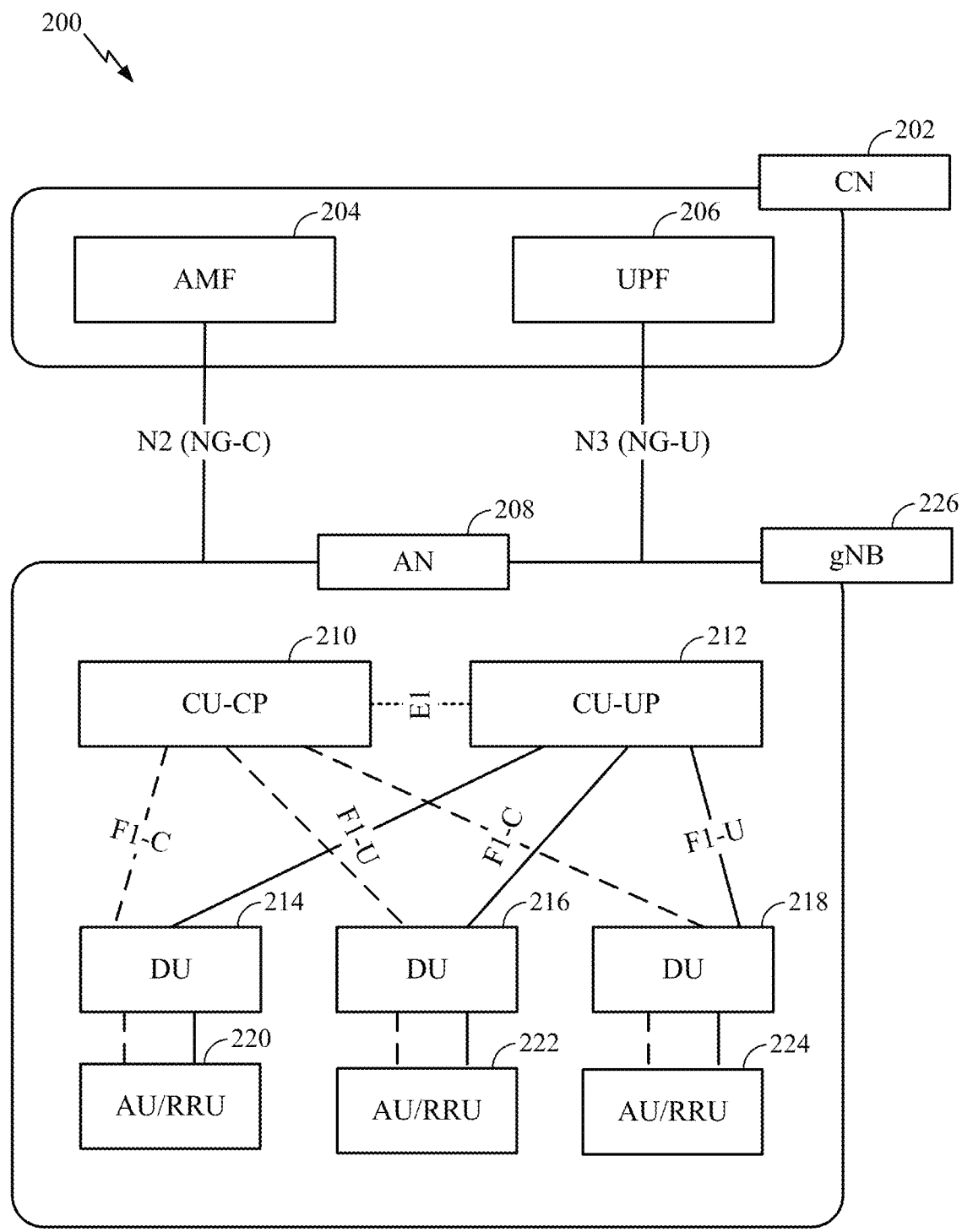
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224. The DU may be connected to an AU/RRU via each of the F1-C and F1-U interfaces.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the N AN and/or UE.

Figure 3:
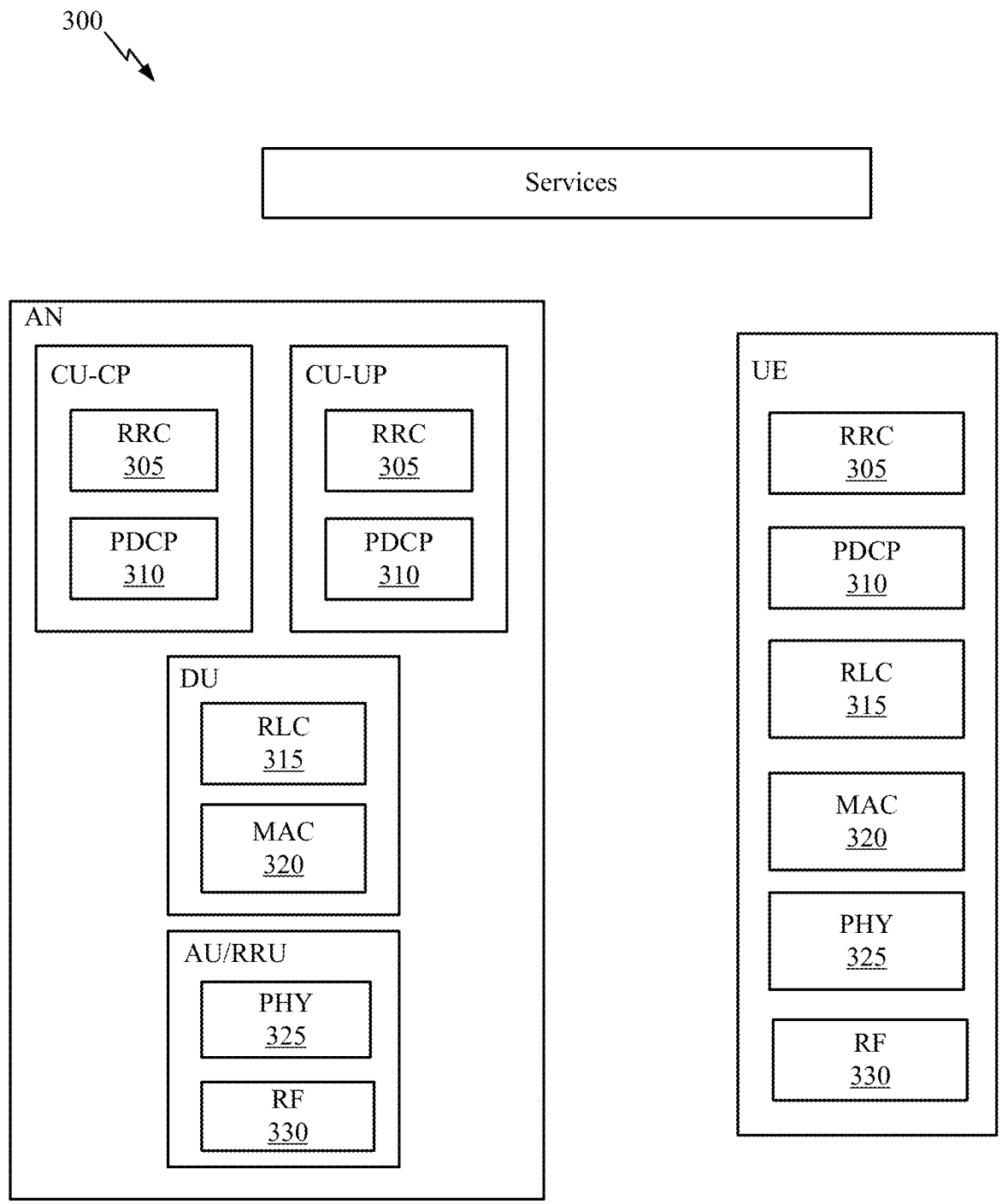
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 330 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
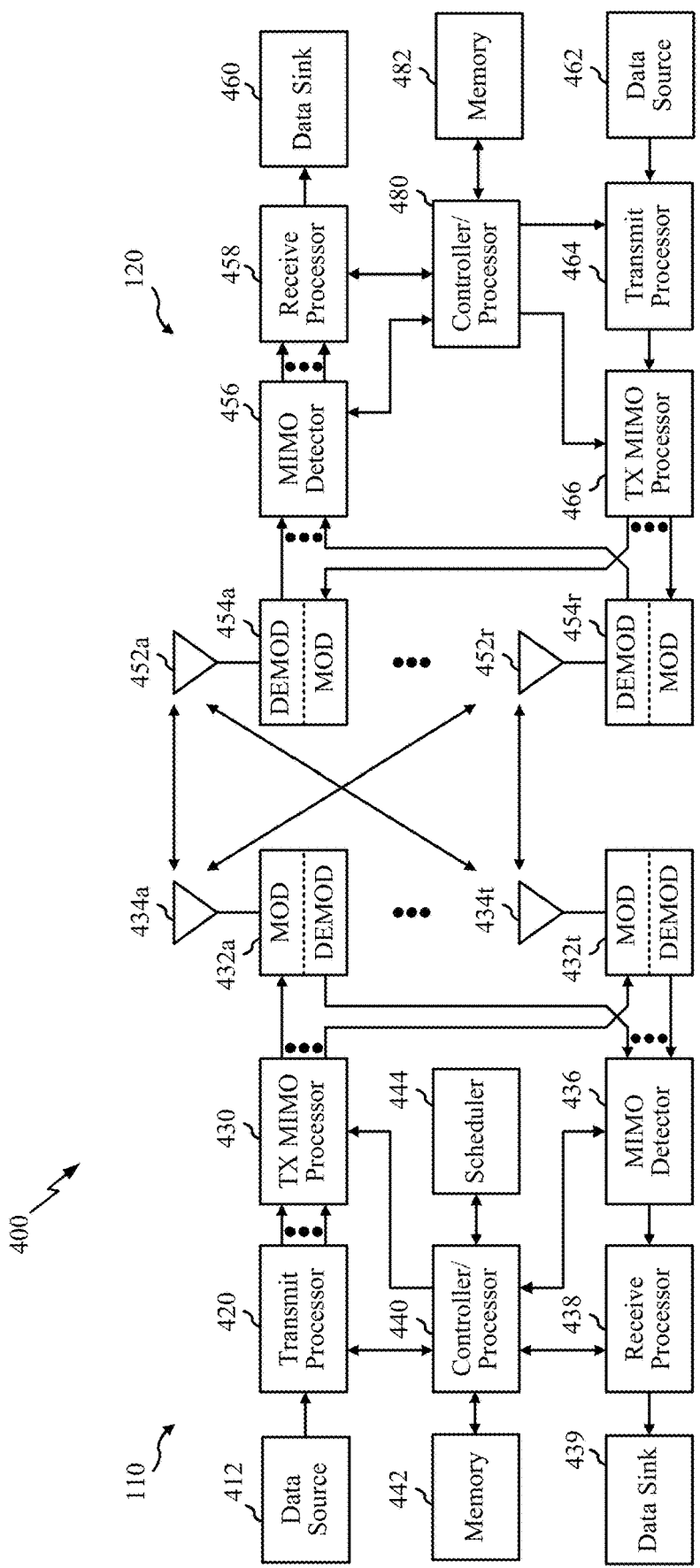
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
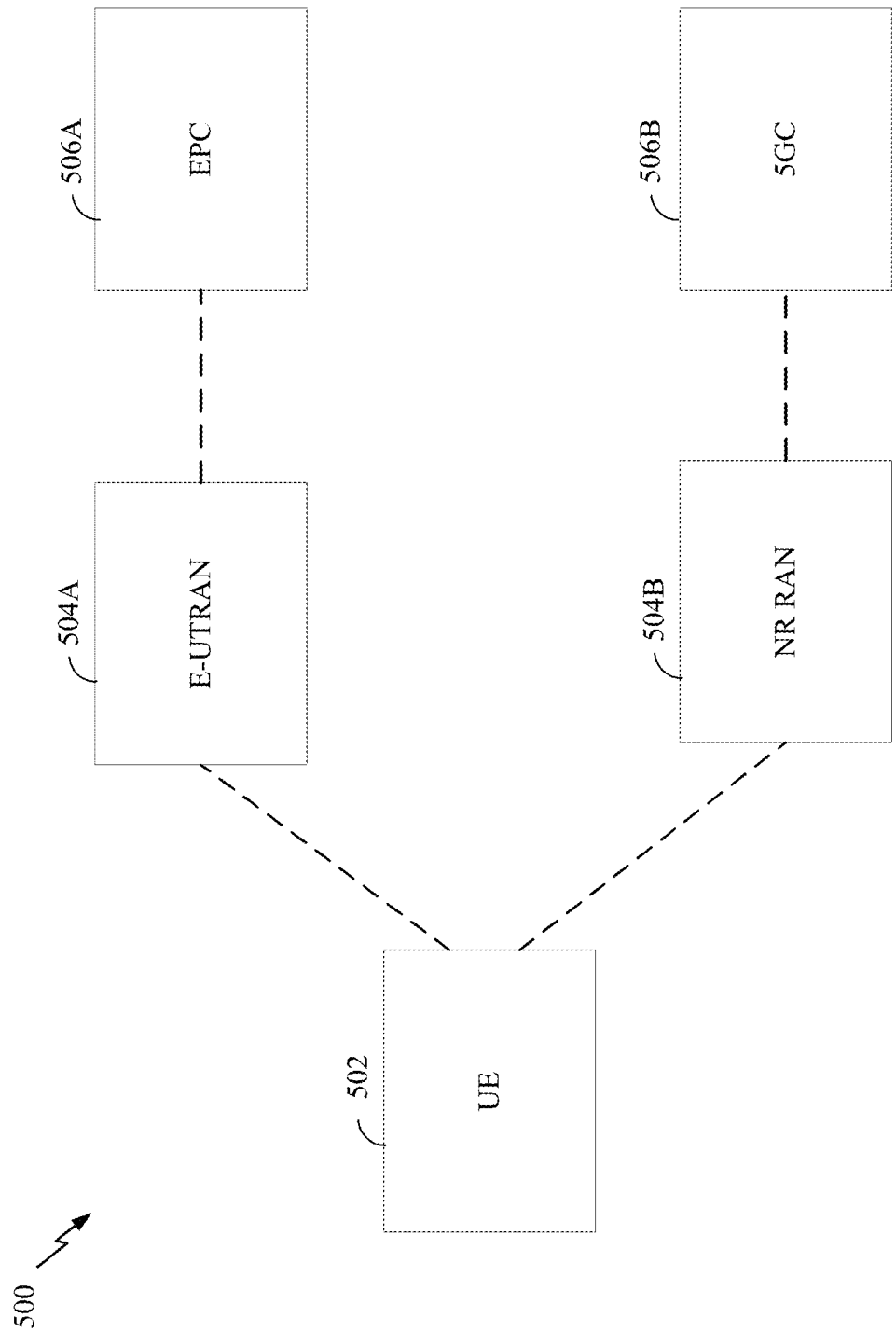
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
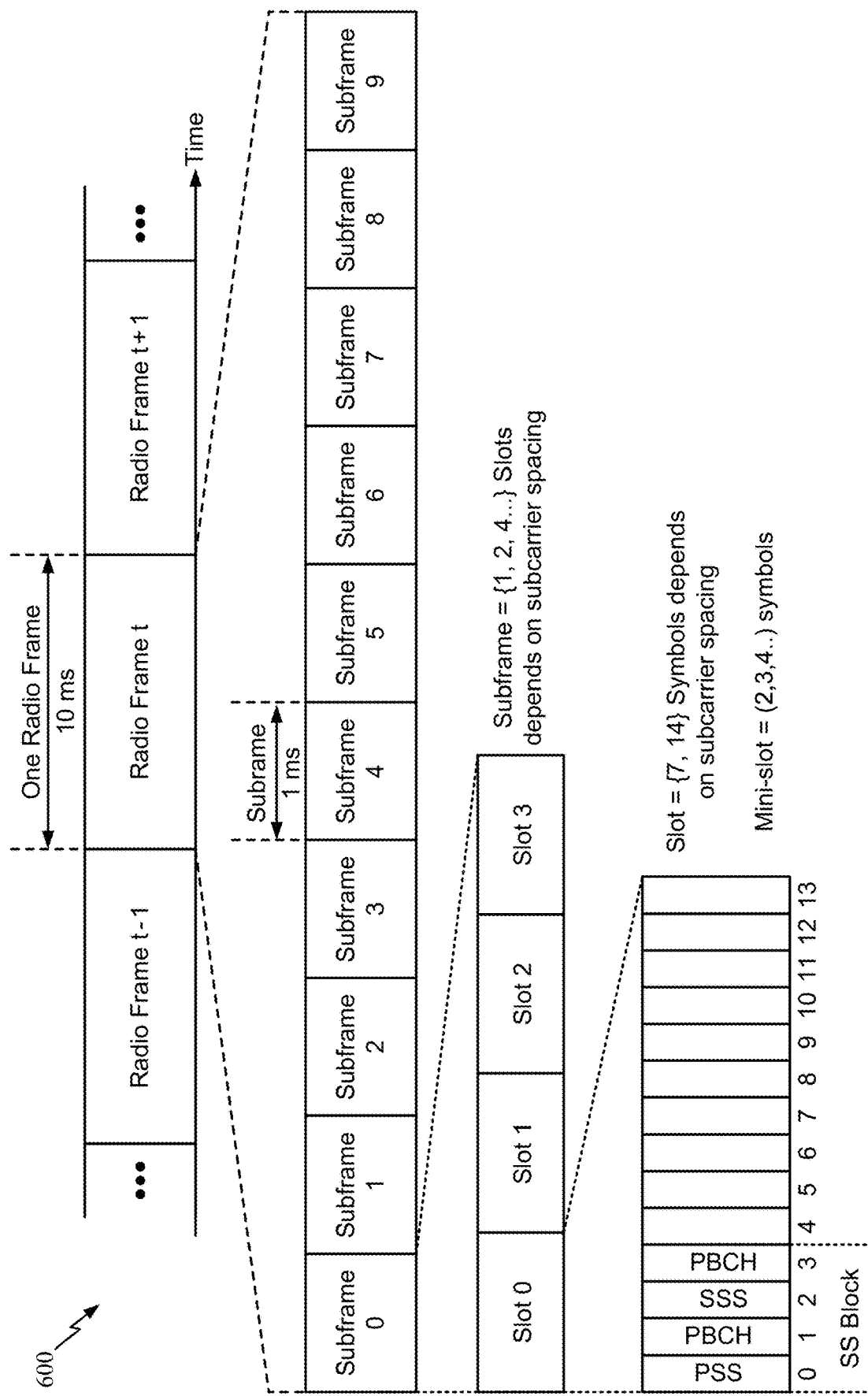
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Dual-Active-Protocol Stack (DAPS) Handover (HO)

One of the goals in mobility enhancement is to accomplish little to no interruption time during handover of a user-equipment (UE) between cells. In some cases, interruption may be reduced by maintaining the source link during target link establishment using a dual active protocol stack (DAPS) handover (HO) technique. During the DAPS HO, the UE may be expected to maintain connectivity with the source and target base stations (e.g., gNBs). This simultaneous connectivity to both the source and target base stations may involve certain beams/panels at the UE being used for transmission and reception from the source and target cells. Thus, the UE may maintain two separate protocol stacks during this HO.

Figure 7:
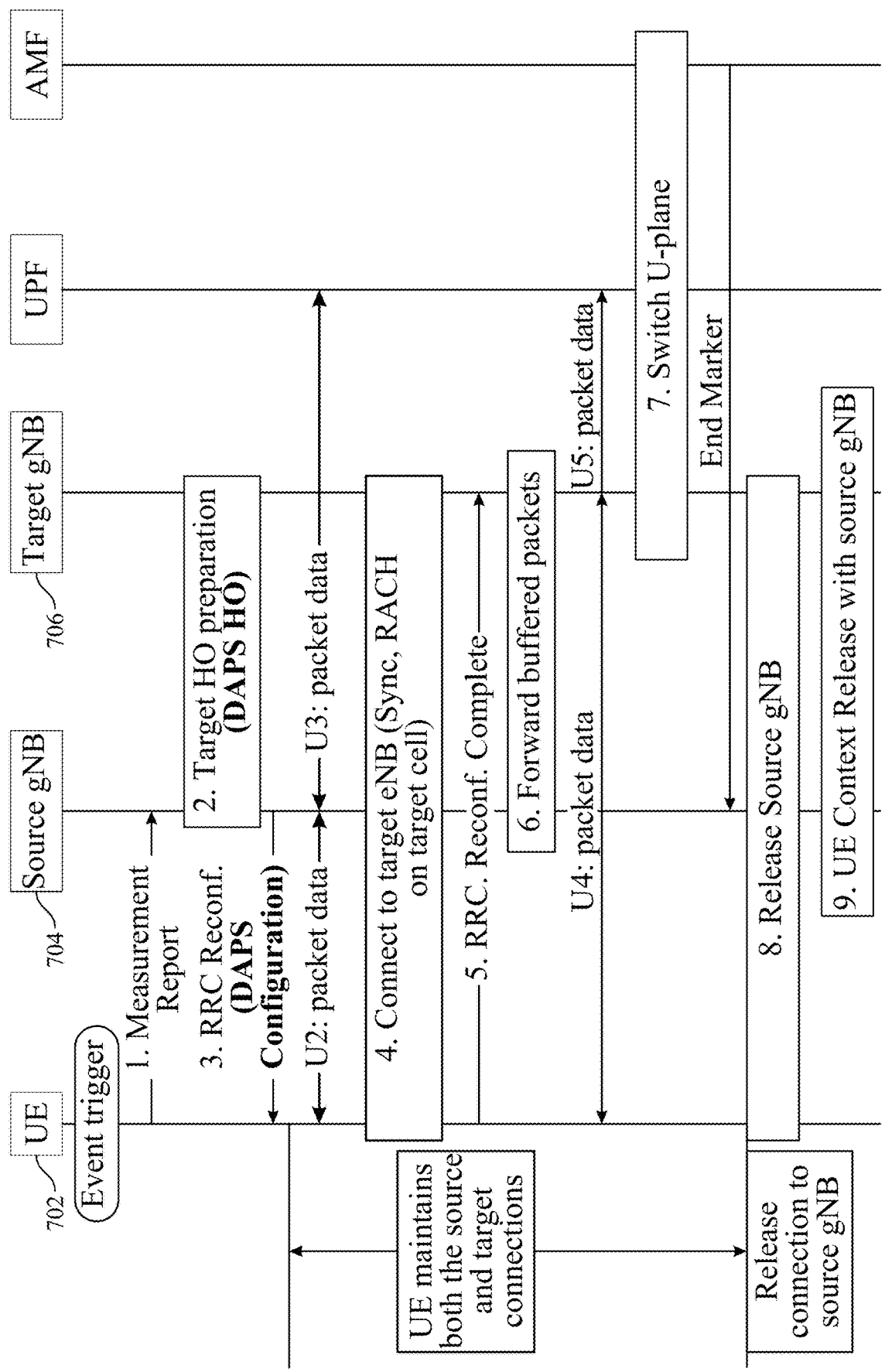
FIG. 7 is a call flow for make-before-break (MBB) handover (HO), in accordance with certain aspects of the present disclosure.

FIG. 7 is a call flow for DAPS HO, in accordance with certain aspects of the present disclosure. As illustrated, upon an event trigger, the UE 702 may transmit, at step 1, a measurement report to a source gNB 704 (e.g., source cell). Based on the measurement report, the source cell (e.g., source gNB 704) may make a DAPS HO decision. At step 2, a UE context setup request/response procedure with the target gNB 706 is performed, as illustrated. At step 3, a radio resource control (RRC) reconfiguration message may be sent by the source cell/source gNB 704 to the UE 702. The RRC reconfiguration message may configure the DAPS HO such that the UE maintains connection with both the target and source cells during a HO period. The RRC reconfiguration message may also configure a type of connection to be maintained during the HO period (e.g., single carrier, CA, or a dormancy CA) with the target and source cell, as described in more detail herein. Source cell determines source cell configuration to be used during DAPS HO and Target cell determines the target cell configuration to be used during DAPS HO such that source+target cell combined configuration will be within maximum UE capability.

At step 4, data transmission and reception may continue with the source cell using the user-plane function 710 while, a connection to the target gNB is established (e.g., synchronization and radio access channel (RACH) signaling is performed). Once the RRC connection reconfiguration is completed, the UE sends, at step 5, a RRC connection reconfiguration complete message to the target gNB. The target gNB then makes a source gNB connection release decision, and at step 6, late data forwarding from source to target cell happens. In case of early data forwarding, source will start forwarding data from source to target cell after step 3. At step 7, DL path switch procedure happens from UPF to target cell. At step 8, an RRC reconfiguration message is sent from the target cell to the UE indicating to the UE to release the connection from the source gNB. The UE then releases the connection from the source gNB and transmits a RRC reconfiguration complete message to the target gNB, in response to which target cell triggers source cell for UE context release from the source gNB at step 9.

As illustrated, during the DAPS HO period (or at least a portion thereof), the UE maintains connection with both the source and target cells, reducing any interruption to service experienced by a user during HO. In other words, the UE maintains simultaneous connectivity with the source and target cells during at least a portion of the HO period. During DAPS HO, for DL, UE will continue to received DL data from both source and target cells. For UL, after successful RACH to target cell, UE will switch UL PDCP data transmission from source to target cell. UE may continue to transmit any MAC HARQ Re-transmissions and RLC Re-transmissions towards source cell.

Example Techniques for Enhancement of Status Data Unit

In new radio (NR), once a regular Packet Data Convergence Protocol (PDCP) radio-bearer (RB) is configured as DAPS RB, the source cell (e.g., source BS or source gNB) may forward original packets (PDCP Service Data Units (SDUs)) to the target cell in addition to transmission from source cell to the user-equipment (UE). The source cell and the target cell have their specific configuration parameters such as Robust Header Compression (RoHC) and Integrity and Ciphering Contexts. A UE may use the received radio link control (RLC)/media access control (MAC)/Physical Layer (PHY) leg details to identify each packet and uses associated configuration parameters to decode/decompress the packets.

Once the RACH is successful on the target cell, DAPS HO is assumed successful from the UE perspective and the UE DAPS PDCP will send a PDCP status PDU in the UL to target cell. The PDCP status PDU may indicate the PDCP PDUs which are not received from the source cell such that the target cell provides transmissions for the PDUs not received by the UE. The source cell based RLC/MAC level retransmissions will continue until the source cell release is executed. Based on the UL PDCP status PDU, the target cell may send retransmission of the original PDCP SDU from the source cell, using the target Cell specific RoHC and Integrity and Ciphering configuration.

The UE may continue to combine the received PDCP SDUs from the target cell along with previously received PDCP SDUs, if any, and process them as per PDCP reordering logics. Once the source cell is completely released, all further data PDU in DL are only transmitted from the target cell. After this, DAPS PDCP DRB will be configured as regular NR PDCP DRB. During the DAPS HO, after source cell sending DAPS HO command to UE, it is left to network implementation to use Initialization and Refresh (IR) mode for packets Initialization and Refresh (IR), to support RoHC context. An IR state packet is a packet that is self-decodable. RoHC is specific to NodeB, while UE has to support both during HO. In one network implementation, it may be possible that source cell may send IR packets after sending DAPS HO command to UE and Target cell send only IR packets to UE until source connection is released.

Figure 8:
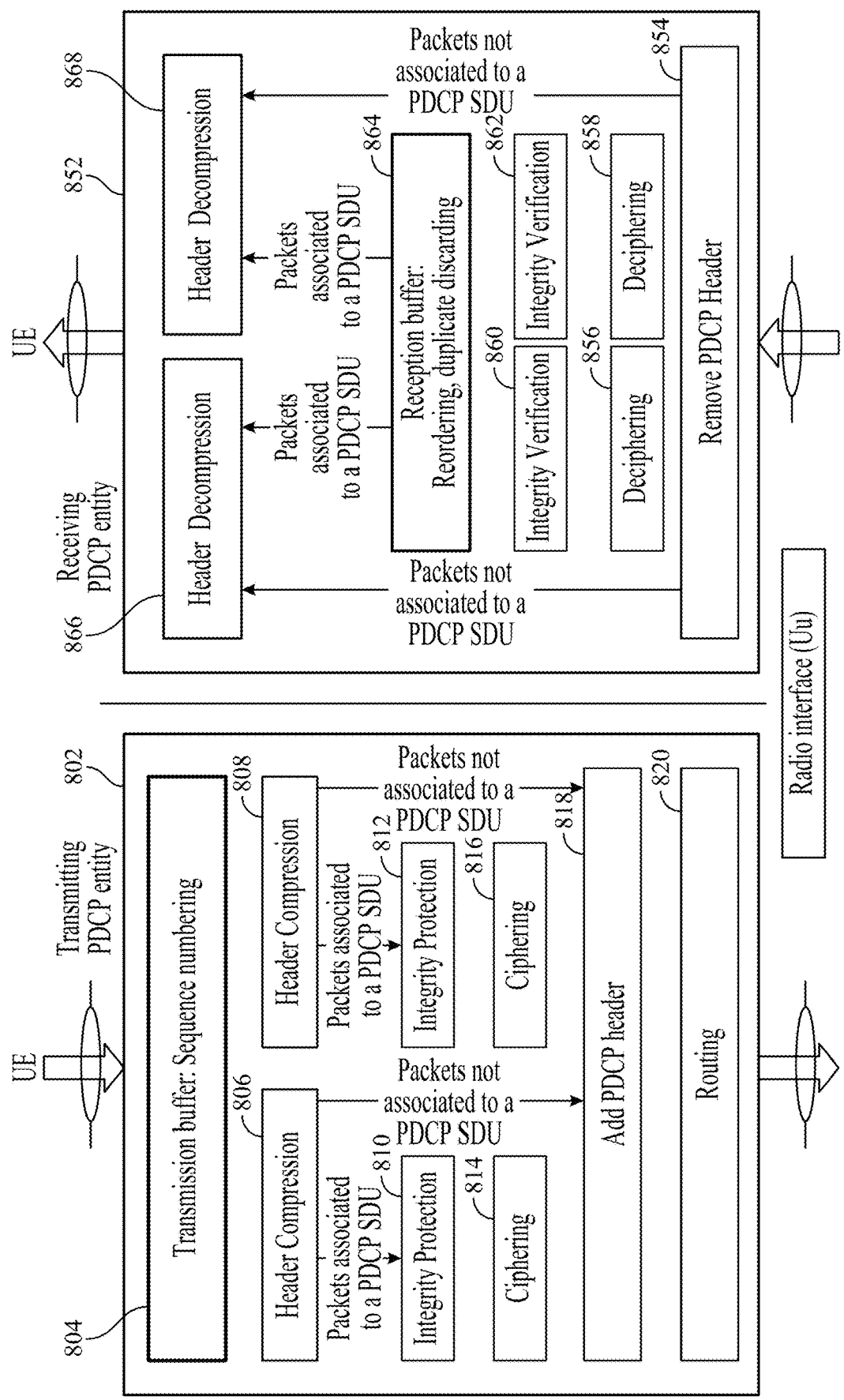
FIG. 8 illustrates a dual-active protocol stack (DAPS) architecture, in accordance with certain aspects of the present disclosure.

FIG. 8 illustrates a DAPS PDCP architecture, in accordance with certain aspects of the present disclosure. As illustrated, a transmitting PDCP entity 802 may include a transmission buffer 804, which may perform sequence numbering for packets to be transmitted. As illustrated, transmitting PDCP entity 802 may also include header compression modules 806, 808 that may perform compression for respective PDCP SDUs. The transmitting PDCP entity 802 may also include integrity protection modules 810, 812, and ciphering modules 814, 816 for respective links and PDCP SDUs. As illustrated, packets not associated to a PDCP SDU may skip the processing associated with the protection modules 810, 812 and the ciphering modules 814, 816. The module 818 may add a PDCP header for packets to be transmitted, followed by module 820 for routing.

The packets may be transmitted to receiving PDCP entity 852, which may include a module 854 for removal of the PDCP header. Moreover, the receiving PDCP entity 852 may include deciphering modules 856, 858, integrity verification modules 860, 862 for respective PDCP SDUs. A reception buffer 864 may perform reordering and duplicate packet discarding operations, as illustrated. As illustrated, packets not associated with a PDCP SDU may skip certain operations and be provided directed to header decompression modules 866, 868.

Figure 9:
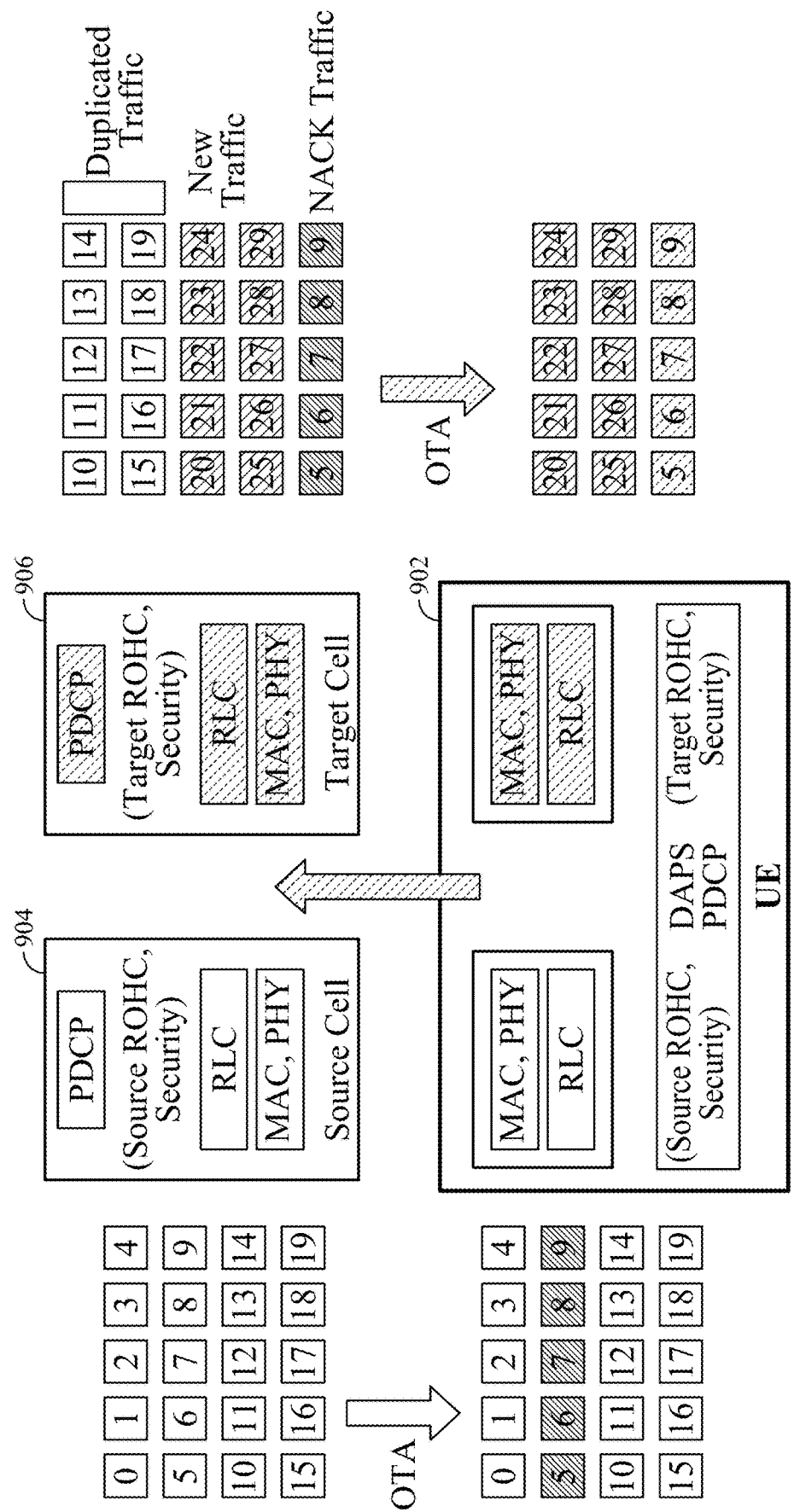
FIG. 9 illustrates an example communication scenario during DAPS HO, in accordance with certain aspects of the present disclosure.

FIG. 9 illustrates an example communication scenario during DAPS HO, in accordance with certain aspects of the present disclosure. The UE 902 may maintain connection with source cell 904 and target cell 906 for communication of packets for various SNs (e.g., also referred to as PDCP SNs). As illustrated, the UE 902 may maintain a DAPS PDCP layer, as well as respective RLC/MAC/PHY layers for respective links. As illustrated, the source cell and target cell each include PHY/MAC/RLC/PDCP layers, as illustrated. The PDCP layer for the source cell performs security and compression using RoHC based on the context of the source cell, and the PDCP layer for the target cell performs security and compression using RoHC based on the context of the target cell.

In certain aspects, the source cell 904 may transmit packets for SNs 0-4 to the UE 902 over the air (OTA), as illustrated. The UE 902 may receive packets for SNs 0-4. The source cell 904 may also transmit packets for SNs 5-9, but the UE may not receive the packets for SNs 5-9. At this point, DAPS may be configured. Thus, subsequent packets transmitted by the source cell 904 may be duplicated by the target cell 906. For example, the source cell 904 may send the packets for SNs 10-19 to the target cell 906 via a backhaul link. The packets for SNs 10-19 may be transmitted by the target cell to the UE. The target cell 906 may also transmit new traffic (e.g., not originated form the source cell 904) such as packets for SNs 20-29, as illustrated. After successful RACH to target cell, the UE 902 may transmit a PDCP status report (also referred to as a PDCP status PDU) to the target cell 906. The PDCP status report may indicate which packets were not received by the UE. For example, the UE 902 may indicate that packets for SNs 5-9 were not received, and the target cell 906 may perform retransmission for those packets, as illustrated. The packets for SNs 5-9 as retransmitted by the target cell may be compressed using the context of the target cell.

The source cell 904 continues ROHC compression after sending DAPS HO command to the UE 902. As described, assuming that the source cell sends DAPS HO command at PDCP SN 10. The UE may not have received PDCP SNs 5-9 from the source cell and successfully received PDCP SNs 10-19 from the source cell. However, although the UE has received PDCP SNs 10-19, the UE may be unable to successfully decompress (e.g., decode) SNs 10-19 until the UE receives and decompresses SNs 5-9 from source cell using the RoHC context of the source cell. In other words, the decompression of each packet is dependent on decompression results of a previous packet. For instance, packets for SN 9 and SN 10 may be compressed using the source cell context. The UE may be unable to decompress SN 10 until the packet for SN 9 has been decompressed, and so on. Therefore, since the UE has failed to receive packets for SNs 5-9 from the source cell, the UE is unable to decompress packets for SNs 10-19.

As described herein, upon successful RACH to target cell, the UE sends PDCP status report to target cell indicating PDPC SNs 5-9 as negative acknowledgement (NACK) and requests for retransmission from the target cell. However, even if the target cell retransmits PDCP SNs 5-9, the PDCP SNs 5-9 are compressed using the target cell RoHC context. Therefore, the UE 902 still fails to successfully decompress PDPC SNs 10-19 received from source cell 904 because PDCP SNs 10-19 are compressed using the source cell context, and PDCP SNs 5-9 retransmitted by the target cell are compressed using the target cell context. In certain aspects of the present disclosure, a UE may request retransmission from the target cell 906 of packets that the UE has failed to receive, as well as other packets that the UE may have received, but failed to decompress.

Figure 10A:
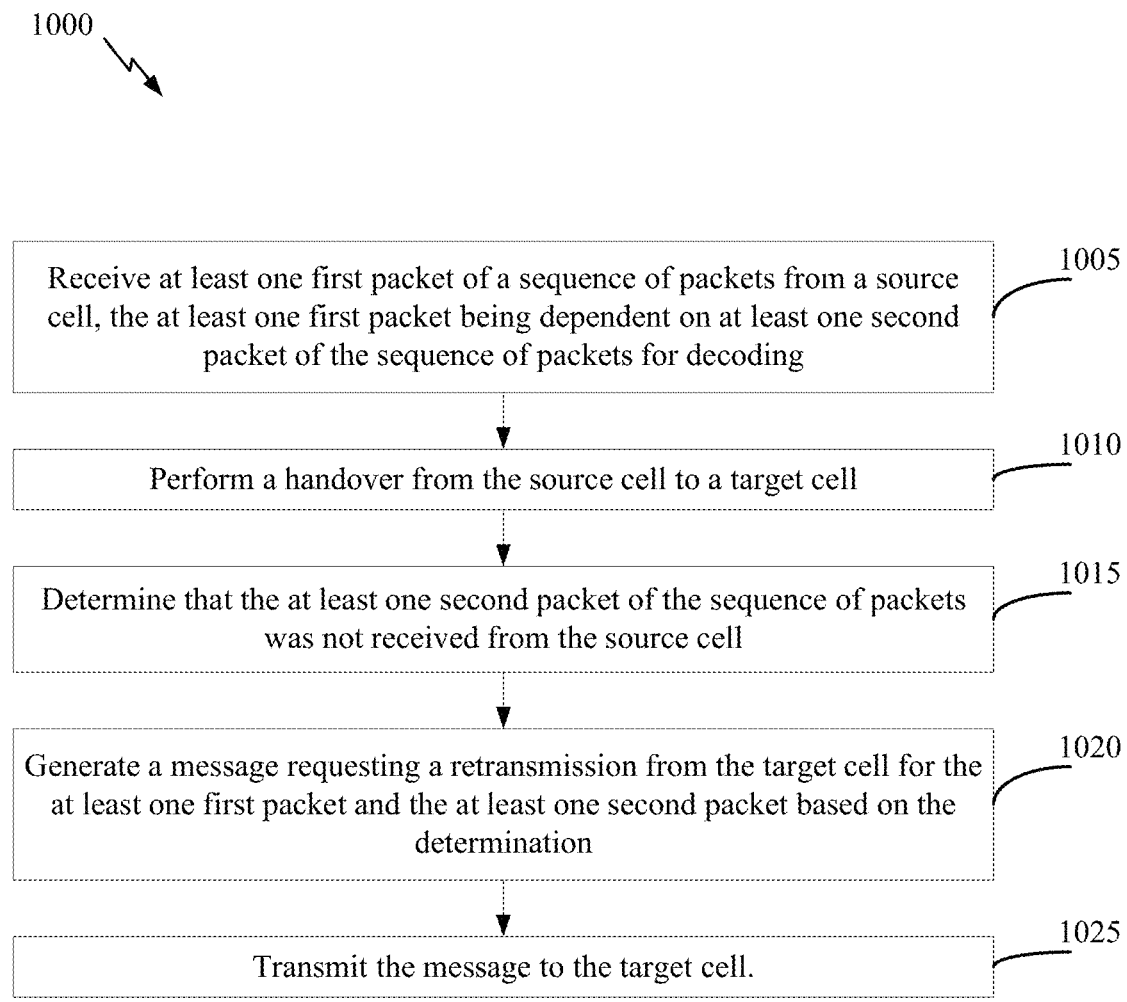
FIG. 10A is a flow diagram illustrating example operations for wireless communication, in accordance with certain aspects of the present disclosure.
Figure 10B:
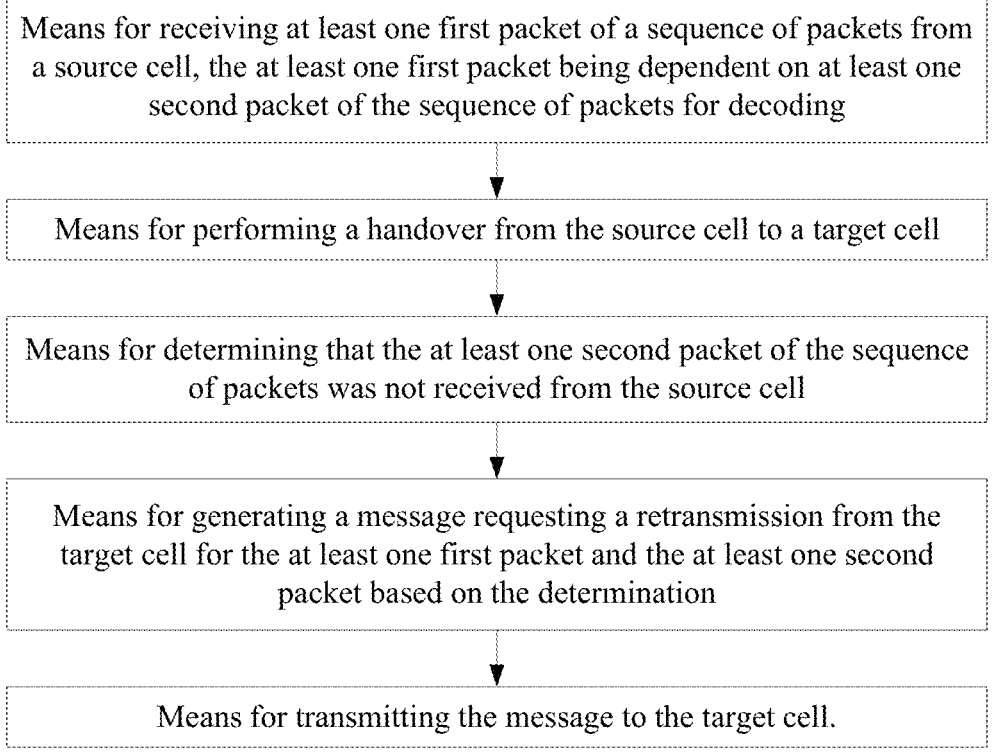
FIG. 10B illustrates example components capable of performing the operations shown in FIG. 10A.

FIG. 10A is a flow diagram illustrating example operations 1000 for wireless communication, in accordance with certain aspects of the present disclosure. The operations 1000 may be performed, for example, by UE (e.g., such as a UE 120 in the wireless communication network 100). The UE may correspond to the receiving PDCP entity 852.

Operations 1000 may be implemented as software components that are executed and run on one or more processors (e.g., processor 480 of FIG. 4). Further, the transmission and reception of signals by the UE in operations 1000 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 1000 may begin, at block 1005, with the UE receiving at least one first packet of a sequence of packets from a source cell, the at least one first packet being dependent on at least one second packet of the sequence of packets for decoding, and at block 1010, performing a handover (e.g., DAPS HO) from the source cell to a target cell. At block 1015, the UE may determine that the at least one second packet of the sequence of packets was not received from the source cell, at block 1020, generate a message requesting a retransmission from the target cell for the at least one first packet and the at least one second packet based on the determination, and at block 1025, transmit the message to the target cell. For example, the UE may detect that the at least one first packet received from the source cell has fails decoding, where the generation of the message requesting the retransmission for the at least one first packet is based on the detection. In certain aspects, the message includes a bitmap having a bit corresponding to each packet of the sequence of packets. The generation of the message may include setting the bits associated with the at least one first packet and the at least one second packet.

In other words, after successful RACH procedure on target cell, if there are any holes from the source cell before DAPS HO, the UE may report from the first missing packets to all the packets received on the source cell, even though some of the packets are received successfully. With this approach, although PDCP SNs 5-9 illustrated in FIG. 9 are only missing and SN 10-19 are successfully received from the source cell 904, the UE may still request retransmission for PDCP SNs 5-19 from the target cell.

In some cases, the source cell may use ROHC Initialization and Refresh (IR) state packets after sending DAPS HO command to UE. An IR state packet is a packet that is self-decodable. In other words, decompression of an IR state packet may be independent of other packets. As described herein, the UE may be missing PDCP SNs 5, 6, 7, 8, and 9 from the source cell and successfully received PDCP SNs 10-19 from the source cell. The PDCP SNs 10-15 may be received with source RoHC compression and SNs 16-19 may be received as IR packets which are self-decodable. In this case, the UE may be unable to successfully decompress SNs 10-15 until the UE receives the packets for SNs 5-9 from the source cell RoHC context. Upon successful RACH to target cell, the UE sends PDCP status report to target cell indicating PDPC SNs 5-9 as NACK and requests for retransmission from target cell. Even if the target cell retransmits PDCP SNs 5-9 (with target ROHC context), UE still fails to successfully decompress PDPC SNs 11-15 received from source cell.

As described herein, after successful RACH procedure on target cell, if there are any holes from the source cell before DAPS HO, the UE may request retransmission for packets starting from the first missing packets to all the packets received on source cell until the UE gets IR state packets from the source cell, even though some of the packets are received successfully. The UE may also request retransmission for any missing IR state packets. For example, even though only PDCP SN 5-9 may not be received by the UE and SNs 10-15 are successfully received by the UE from the source cell, the UE may request for retransmission for packets for SNs 5-15 from the target cell. The UE may forgo requesting retransmission of PDCP SNs 16-19 because these packets are received in IR state and are self-decodable. The UE may also request retransmission for one or more IR state packets if the IR state packets fail decoding at the UE.

Certain aspects provide techniques for NR PDCP status reporting. For acknowledge mode (AM) data radio bearers (DRBs) configured by upper layers to send a PDCP status report in the uplink, a receiving PDCP entity may trigger a PDCP status report when the upper layer requests a PDCP entity reestablishment or the upper layer requests a PDCP data recovery. If a PDCP status report is triggered, the receiving PDCP entity may compile a PDCP status report by setting a first missing COUNT (FMC) field to RX_DELIV. The FMC field indicates the COUNT value of the first missing PDCP SDU within a reordering window (e.g., RX_DELIV). RX_DELIV indicates the COUNT value of the first PDCP SDU not delivered to the upper layers, but still waited for. RX_NEXT indicates the COUNT value of the next PDCP SDU expected to be received. If RX_DELIV is less than RX_NEXT, the receiving PDCP entity allocates a bitmap field of length in bits equal to the number of COUNTs from and not including the first missing PDCP SDU up to and including the last out-of-sequence PDCP SDUs, rounded up to the next multiple of 8, or up to and including a PDCP SDU for which the resulting PDCP control PDU size is equal to 9000 bytes, whichever comes first. In certain aspects of the present disclosure, the receiving PDCP entity (e.g., UE) also sets in the bitmap field as '0' for all PDCP SDUs that have not been received, and optionally PDCP SDUs for which decompression have failed. The receiving PDCP entity also sets in the bitmap field as '1' for all PDCP SDUs that have been received. The receiving PDCP entity then submits the PDCP status report to lower layers as the first PDCP PDU for transmission via the transmitting PDCP entity. The bitmap field indicates which SDUs are missing and which SDUs are correctly received in the receiving PDCP entity. The bit position of $N^{th}$ bit in the bitmap is N, e.g., the bit position of the first bit in the bitmap is 1.

Certain aspects provide techniques for LTE PDCP status reporting. When upper layers request a PDCP reestablishment or PDCP data recovery, or when PDCP status report is triggered by polling or periodic reporting, or when PDCP status report is triggered by WLAN connection status reporting of temporary unavailability, for radio bearers that are mapped on RLC AM, the UE may compile a status report. The status report may be complied if the radio bearer is configured by upper layers to send a PDCP status report in the uplink or the status report is triggered by PDCP status report polling or PDCP periodic status reporting or the status report is triggered by WLAN Connection Status Reporting of temporary unavailability when wlan-SuspendTriggersStatusReport is configured. The status report may be complied after processing the PDCP data PDUs that are received from lower layers due to the reestablishment of the lower layers, and submit it to lower layers as the first PDCP PDU for the transmission, by setting the FMS field to the PDCP SN of the first missing PDCP SDU. The UE may, if there is at least one out-of-sequence PDCP SDU stored, allocate a Bitmap field of length in bits equal to the number of PDCP SNs from and not including the first missing PDCP SDU up to and including the last out-of-sequence PDCP SDUs, rounded up to the next multiple of 8, or up to and including a PDCP SDU for which the resulting PDCP Control PDU size is equal to 8188 bytes, whichever comes first. In certain aspects of the present disclosure, the UE may also set as '0' in the corresponding position in the bitmap field for all PDCP SDUs that have not been received as indicated by lower layers, and optionally PDCP SDUs for which decompression have failed, and indicate in the bitmap field as '1' for all other PDCP SDUs. The UE fills the bitmap indicating which SDUs are missing (unset bit—'0'), i.e. whether an SDU has not been received or optionally has been received but has not been decompressed correctly, and which SDUs do not need retransmission (set bit—'1') i.e. whether an SDU has been received correctly and may or may not have been decompressed correctly.

In addition to the various aspects described above, aspects of specific combinations are within the scope of the disclosure, some of which are detailed below:

Aspect 1: A method for wireless communications, comprising: receiving at least one first packet of a sequence of packets from a source cell, the at least one first packet being dependent on at least one second packet of the sequence of packets for decoding; performing a handover from the source cell to a target cell; determining that the at least one second packet of the sequence of packets was not received from the source cell; generating a message requesting a retransmission from the target cell for the at least one first packet and the at least one second packet based on the determination; and transmitting the message to the target cell.

Aspect 2: The method of Aspect 1, wherein the handover comprises a dual-active protocol stack (DAPS) handover.

Aspect 3: The method of any one of Aspects 1-2, wherein the message comprises a data unit status message.

Aspect 4: The method of any one of Aspects 1-3, further comprising: receiving the retransmission for the at least one first packet and the at least one second packet from the target cell; decoding the at least one second packet retransmitted by target cell; and decoding the at least one first packet retransmitted by target cell based on the decoded at least one second packet.

Aspect 5: The method of any one of Aspects 1-4, wherein the at least one first packet and the at least one second packet are encoded using a robust header compression (RoHC) protocol.

Aspect 6: The method of any one of Aspects 1-5, wherein a sequence number associated with each of the at least one first packet is greater than a sequence number associated with each of the at least one second packet.

Aspect 7: The method of any one of Aspects 1-6, further comprising detecting that the at least one first packet obtained from the source cell fails decoding, wherein the generation of the message is further based on the detection.

Aspect 8: The method of any one of Aspects 1-7, further comprising receiving at least one third packet of the sequence of packets from the source cell, the at least one third packet being self-decodable.

Aspect 9: The method of Aspect 8, further comprising: determining that the at least one third packet is self-decodable; and forgoing requesting retransmission of the at least one third packet from the target cell via the message based on the determination.

Aspect 10: The method of Aspect 8, wherein: a sequence number associated with each of the at least one first packet is greater than a sequence number associated with each of the at least one second packet; and a sequence number associated with each of the at least one third packet is greater than the sequence number associated with each of the at least one second packet.

Aspect 11: The method of any one of Aspects 1-10, further comprising determining that at least one third packet was not received from the source cell, the at least one third packet being self-decodable, wherein the message further requests retransmission for the at least one third packet from the target cell.

Aspect 12: The method of any one of Aspects 1-11, wherein the message comprises a bitmap having a bit corresponding to each packet of the sequence of packets, wherein the generation of the message comprises setting the bits associated with the at least one first packet and the at least one second packet.

Aspect 13: A wireless node, comprising: a receiver configured to receive at least one first packet of a sequence of packets from a source cell, the at least one first packet being dependent on at least one second packet of the sequence of packets for decoding; a processing system configured to perform a handover from the source cell to a target cell, determine that the at least one second packet of the sequence of packets was not received from the source cell, and generate a message requesting a retransmission from the target cell for the at least one first packet and the at least one second packet based on the determination; and a transmitter configured to transmit the message to the target cell.

Aspect 14: The wireless node of Aspect 13, wherein the handover comprises a dual-active protocol stack (DAPS) handover.

Aspect 15: The wireless node of any one of Aspects 13-14, wherein the message comprises a data unit status message.

Aspect 16: The wireless node of any one of Aspects 13-15, wherein: the receiver is further configured to receive the retransmission for the at least one first packet and the at least one second packet from the target cell; and the processing system is configured to decode the at least one second packet retransmitted by target cell and decode the at least one first packet retransmitted by target cell based on the decoded at least one second packet.

Aspect 17: The wireless node of any one of Aspects 13-16, wherein the at least one first packet and the at least one second packet are encoded using a robust header compression (RoHC) protocol.

Aspect 18: The wireless node of any one of Aspects 13-17, wherein a sequence number associated with each of the at least one first packet is greater than a sequence number associated with each of the at least one second packet.

Aspect 19: The wireless node of any one of Aspects 13-18, wherein the processing system is further configured to detect that the at least one first packet obtained from the source cell fails decoding, wherein the generation of the message is further based on the detection.

Aspect 20: The wireless node of any one of Aspects 13-19, wherein the receiver is further configured to receive at least one third packet of the sequence of packets from the source cell, the at least one third packet being self-decodable.

Aspect 21: The wireless node of Aspect 20, wherein the processing system is further configured to: determine that the at least one third packet is self-decodable; and forgo requesting retransmission of the at least one third packet from the target cell via the message based on the determination.

Aspect 22: The wireless node of Aspect 20, wherein: a sequence number associated with each of the at least one first packet is greater than a sequence number associated with each of the at least one second packet; and a sequence number associated with each of the at least one third packet is greater than the sequence number associated with each of the at least one second packet.

Aspect 23: The wireless node of any one of Aspects 13-22, wherein the processing system is further configured to determine that at least one third packet was not received from the source cell, the at least one third packet being self-decodable, wherein the message further requests retransmission for the at least one third packet from the target cell.

Aspect 24: The wireless node of any one of Aspects 13-23, wherein the message comprises a bitmap having a bit corresponding to each packet of the sequence of packets, wherein the generation of the message comprises setting the bits associated with the at least one first packet and the at least one second packet.

Aspect 25: A wireless node, comprising: means for receiving at least one first packet of a sequence of packets from a source cell, the at least one first packet being dependent on at least one second packet of the sequence of packets for decoding; means for performing a handover from the source cell to a target cell; means for determining that the at least one second packet of the sequence of packets was not received from the source cell; means for generating a message requesting a retransmission from the target cell for the at least one first packet and the at least one second packet based on the determination; and means for transmitting the message to the target cell.

Aspect 26: The wireless node of Aspect 25, wherein the handover comprises a dual-active protocol stack (DAPS) handover.

Aspect 27: The wireless node of any one of Aspects 25-26, wherein the message comprises a data unit status message.

Aspect 28: The wireless node of any one of Aspects 25-27, further comprising: means for receiving the retransmission for the at least one first packet and the at least one second packet from the target cell; means for decoding the at least one second packet retransmitted by target cell; and means for decoding the at least one first packet retransmitted by target cell based on the decoded at least one second packet.

Aspect 29: The wireless node of any one of Aspects 25-28, wherein the at least one first packet and the at least one second packet are encoded using a robust header compression (RoHC) protocol.

Aspect 30: The wireless node of any one of Aspects 25-29, wherein a sequence number associated with each of the at least one first packet is greater than a sequence number associated with each of the at least one second packet.

Aspect 31: The wireless node of any one of Aspects 25-30, further comprising means for detecting that the at least one first packet obtained from the source cell fails decoding, wherein the generation of the message is further based on the detection.

Aspect 32: The wireless node of any one of Aspects 25-31, further comprising means for receiving at least one third packet of the sequence of packets from the source cell, the at least one third packet being self-decodable.

Aspect 33: The wireless node of Aspect 32, further comprising: means for determining that the at least one third packet is self-decodable; and means for forgoing requesting retransmission of the at least one third packet from the target cell via the message based on the determination.

Aspect 34: The wireless node of Aspect 32, wherein: a sequence number associated with each of the at least one first packet is greater than a sequence number associated with each of the at least one second packet; and a sequence number associated with each of the at least one third packet is greater than the sequence number associated with each of the at least one second packet.

Aspect 35: The wireless node of any one of Aspects 25-34, further comprising means for determining that at least one third packet was not received from the source cell, the at least one third packet being self-decodable, wherein the message further requests retransmission for the at least one third packet from the target cell.

Aspect 36: The wireless node of any one of Aspects 25-35, wherein the message comprises a bitmap having a bit corresponding to each packet of the sequence of packets, wherein the generation means comprises means for setting the bits associated with the at least one first packet and the at least one second packet.

Aspect 37: An apparatus for wireless communications, comprising: a first interface configured to obtain at least one first packet of a sequence of packets from a source cell, the at least one first packet being dependent on at least one second packet of the sequence of packets for decoding; a processing system configured to perform a handover from the source cell to a target cell, determine that the at least one second packet of the sequence of packets was not received from the source cell, and generate a message requesting a retransmission from the target cell for the at least one first packet and the at least one second packet based on the determination; and a second interface configured to output the message for transmission to the target cell.

Aspect 38: A computer-readable medium for wireless communications, comprising instructions executable to: obtain at least one first packet of a sequence of packets from a source cell, the at least one first packet being dependent on at least one second packet of the sequence of packets for decode; perform a handover from the source cell to a target cell; determine that the at least one second packet of the sequence of packets was not received from the source cell; generate a message requesting a retransmission from the target cell for the at least one first packet and the at least one second packet based on the determination; and output the message, for transmission, to the target cell.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting (or means for outputting for transmission) may include a transmitter and/or an antenna(s) 434 of the BS 110 or the transmitter unit 254 and/or antenna(s) 452 of the UE 120 illustrated in FIG. 4. Means for receiving (or means for obtaining) may include a receiver and/or an antenna(s) 434 of the BS 110 or a receiver and/or antenna(s) 452 of the UE 120 illustrated in FIG. 4. Means for communicating may include a transmitter, a receiver or both. Means for generating, means for performing, means for determining, means for decoding, means for detecting, means for forging, and means for setting may include a processing system, which may include one or more processors, such as the transmit processor 420, the TX MIMO processor 430, the receive processor 438, and/or the controller/processor 440 of the BS 110 or the receive processor 458, the transmit processor 464, the TX MIMO processor 466, and/or the controller/processor 480 of the UE 120 illustrated in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless node, comprising:
   a receiver configured to receive at least one first packet of a sequence of packets from a source cell, the at least one first packet being dependent on at least one second packet of the sequence of packets for decoding;
   a processing system configured to:
      perform a handover from the source cell to a target cell;
      determine that the at least one second packet of the sequence of packets was not received from the source cell; and
      generate a message requesting a retransmission from the target cell for the at least one first packet and the at least one second packet based on the determination; and
   a transmitter configured to transmit the message to the target cell.

2. The wireless node of claim 1, wherein the handover comprises a dual-active protocol stack (DAPS) handover.

3. The wireless node of claim 1, wherein the message comprises a data unit status message.

4. The wireless node of claim 1, wherein:
   the receiver is further configured to receive the retransmission for the at least one first packet and the at least one second packet from the target cell; and
   the processing system is configured to:
      decode the at least one second packet retransmitted by target cell; and
      decode the at least one first packet retransmitted by target cell based on the decoded at least one second packet.

5. The wireless node of claim 1, wherein the at least one first packet and the at least one second packet are encoded using a robust header compression (RoHC) protocol.

6. The wireless node of claim 1, wherein a sequence number associated with each of the at least one first packet is greater than a sequence number associated with each of the at least one second packet.

7. The wireless node of claim 1, wherein the processing system is further configured to:
   detect that the at least one first packet obtained from the source cell fails decoding, wherein the processing system is configured to generate the message further based on the detection.

8. The wireless node of claim 1, wherein the receiver is further configured to receive at least one third packet of the sequence of packets from the source cell, the at least one third packet being self-decodable.

9. The wireless node of claim 8, wherein the processing system is further configured to:
   forgo requesting retransmission of the at least one third packet from the target cell via the message based on the at least one third packet being self-decodable.

10. The wireless node of claim 8, wherein:
    a sequence number associated with each of the at least one first packet is greater than a sequence number associated with each of the at least one second packet; and
    a sequence number associated with each of the at least one third packet is greater than the sequence number associated with each of the at least one second packet.

11. The wireless node of claim 1, wherein the processing system is further configured to determine that at least one third packet was not received from the source cell, the at least one third packet being self-decodable, wherein the processing system is further configured to generate the message to request retransmission for the at least one third packet from the target cell.

12. The wireless node of claim 1, wherein the message comprises a bitmap including a plurality of bits, wherein each respective bit of the plurality of bits corresponds to a respective packet of the sequence of packets, wherein to generate the message, the processing system is further configured to set the respective bits associated with the at least one first packet and the at least one second packet.

13. A method for wireless communications, comprising:
    receiving at least one first packet of a sequence of packets from a source cell, the at least one first packet being dependent on at least one second packet of the sequence of packets for decoding;
    performing a handover from the source cell to a target cell;
    determining that the at least one second packet of the sequence of packets was not received from the source cell;
    generating a message requesting a retransmission from the target cell for the at least one first packet and the at least one second packet based on the determination; and
    transmitting the message to the target cell.

14. The method of claim 13, further comprising:
    receiving the retransmission for the at least one first packet and the at least one second packet from the target cell;
    decoding the at least one second packet retransmitted by target cell; and
    decoding the at least one first packet retransmitted by target cell based on the decoded at least one second packet.

15. The method of claim 13, further comprising:
    detecting that the at least one first packet obtained from the source cell fails decoding, wherein generating the message is further comprises generating the message based on the detection.

16. The method of claim 13, further comprising:
    receiving at least one third packet of the sequence of packets from the source cell, the at least one third packet being self-decodable.

17. The method of claim 16, further comprising:
    forgoing requesting retransmission of the at least one third packet from the target cell via the message based on the at least one third packet being self-decodable.

18. The method of claim 13, further comprising:
    determining that at least one third packet was not received from the source cell, the at least one third packet being self-decodable, wherein generating the message further comprises generating message to request retransmission for the at least one third packet from the target cell.

19. The method of claim 13, wherein the message comprises a bitmap including a plurality of bits, wherein each respective bit of the plurality of bits corresponds to a respective packet of the sequence of packets, wherein generating the message comprises setting the respective bits associated with the at least one first packet and the at least one second packet.

20. An apparatus for wireless communications, comprising:
    a first interface configured to obtain at least one first packet of a sequence of packets from a source cell, the at least one first packet being dependent on at least one second packet of the sequence of packets for decoding;

a processing system configured to:
- perform a handover from the source cell to a target cell;
- determine that the at least one second packet of the sequence of packets was not received from the source cell; and
- generate a message requesting a retransmission from the target cell for the at least one first packet and the at least one second packet based on the determination; and a second interface configured to output the message for transmission to the target cell.

* * * * *